A. PRICE.
FILM CONVEYING APPARATUS.
APPLICATION FILED DEC. 11, 1920.
1,412,216. Patented Apr. 11, 1922.
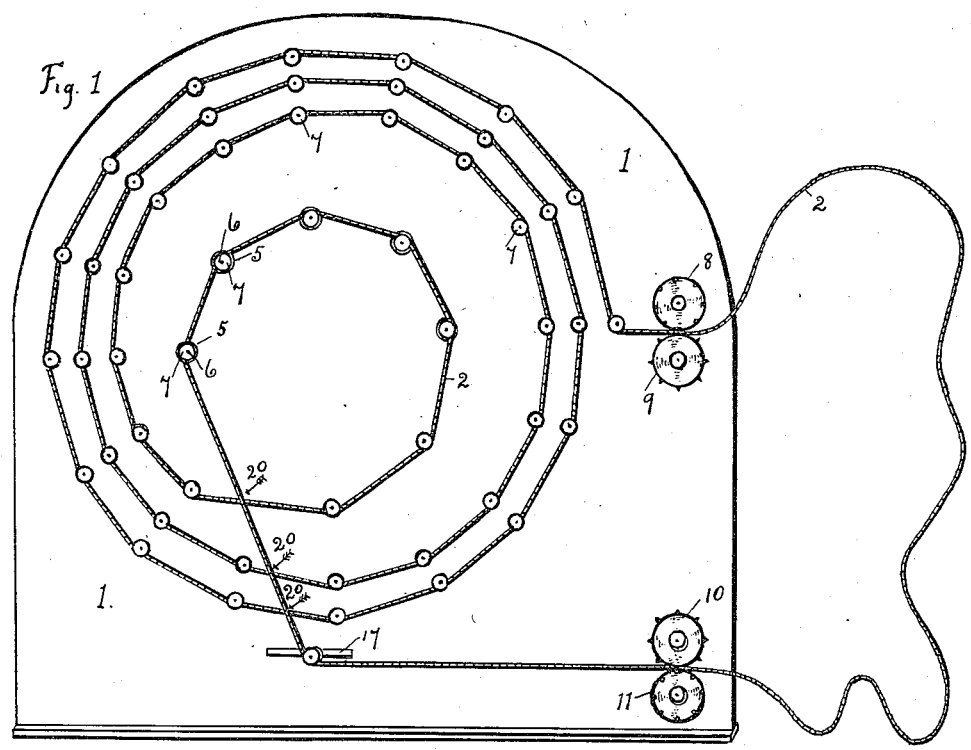
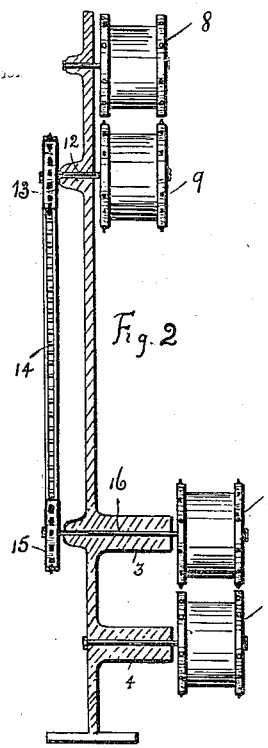
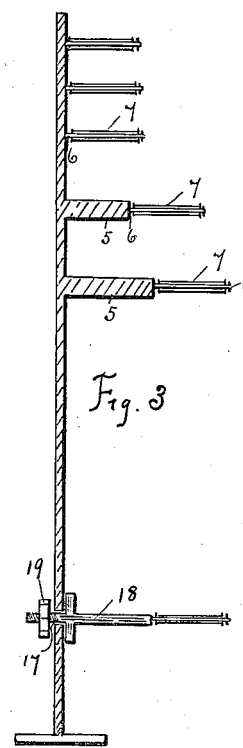
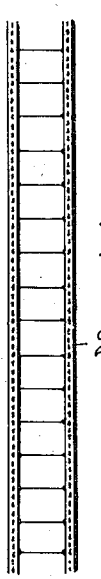
Inventor
Arthur Price

UNITED STATES PATENT OFFICE.

ARTHUR PRICE, OF FREEPORT, NEW YORK.

FILM-CONVEYING APPARATUS.

1,412,216.   Specification of Letters Patent.   Patented Apr. 11, 1922.

Application filed December 11, 1920. Serial No. 430,016.

*To all whom it may concern:*

Be it known that I, ARTHUR PRICE, a citizen of the United States, residing at Freeport, in the county of Nassau and State of New York, have invented new and useful Improvements in Film-Conveying Apparatus for Use with Motion-Picture-Projection Machines, of which the following is a specification.

My invention relates to the methods of controlling the travel of a film during the process of projection, with special reference to the progressively uninterrupted repetition of a motion picture exhibition by affixing the film to be exhibited to a perforated endless belt operating on a series of freely revolving spools mounted on a suitable frame.

My objects are, first, to replace the use in connection with a motion picture projection machine, of the film "feed" and "take up" reels now generally employed; seond, to provide a perforated endless belt of appropriate thinness designed as a medium of transit for the film; third, to provide a frame equipped with a multiplicity of freely revolving spools so situated with reference to the frame as to form an unobstructed way of travel for the belt bearing the film; and fourth, to provide controlling sprockets through which the belt shall run, to regulate in unison the "feed off" and "take on" of the belt with reference to the frame and spool assembly.

I attain the objects sought by means of the apparatus illustrated in the accompanying drawing in which;

Fig. 1 is a side elevation of the apparatus; Fig. 2, a vertical section of the frame showing belt control mechanism; Fig. 3, a vertical section of the frame and spools, and Fig. 4 is a fragmentary front elevation of the endless belt.

Similar numerals refer to similar parts throughout the several views.

The plate 1, Fig. 1, (constructed preferably of metal) is mounted on a suitable base and is provided with extending arms 3, 4, Fig. 2, and 5, 5, Fig. 3, the latter in sufficient numbers and so situated as to suit the purpose as hereinafter described. Also incorporated in connection with the plate 1 are a sufficient number of the spool shafts 6, 6, 6, Fig. 3, (fifty of such shafts being necessary in the present instance as shown in Fig. 1) the assembly hereto described constituting the framework of the apparatus. The sprocket 9 is provided with teeth so placed as to engage the side perforations in endless belt 2, and is designed to revolve in relation with sprocket 8, the latter having receiving holes for accommodation of the teeth in sprocket 9. These two sprockets are so situated with reference to each other as to permit the endless belt 2, with film attached, to run between their nearest points of surface proximity, and are installed in such a manner as to control the movement of the belt. The sprockets 10 and 11 form a similar combination to the sprockets 8 and 9 and have a similar purpose. The two sprocket combinations referred to are designed to operate in a like direction of movement and at a uniform speed by means of roller chain 14, Fig. 2, operating on reverse side of plate 1, connecting chain wheel 13, which is attached to sprocket 9 by the shaft 12, and chain wheel 15, attached to sprocket 10 by the shaft 16. The sprocket combinations, chain wheels, connecting shafts, and roller chain are installed on the frame plate as indicated in Fig. 2. Sprockets 8 and 9 constitute the "feed off" control sprockets, and sprockets 10 and 11 constitute the "take on" control sprockets, to function in the manner as hereinafter described. On spool shafts 6, 6, 6, the spools 7, 7, 7, are mounted in a manner permitting them to freely revolve, and the endless belt 2 is installed as indicated in Fig. 1. In order to secure the appropriate tension on the endless belt with reference to its course from the point where it is drawn into the frame area by "take on" control sprockets and thence through the line of travel of the spools and continuing to the "feed off" control sprockets, I have found it convenient to provide in the plate 1, the slot 17, permitting the rod 18, to which is attached one of the spools 7, to be moved to a point along the slot as best suits the belt tension desired. The adjustment secured is then preserved by tightening nut 19. Fig. 3, on the rod 18, on reverse side of plate 1. It will be noted at the points 20, 20, 20, Fig. 1, indicated by arrows, that the belt crosses, and clearance at the points indicated is provided for by the rod 18 and initial extending arm 5 near the middle of frame plate being long enough to hold the belt sufficiently distant from the plate so that contact with another portion of the belt or any part of the frame assembly will be avoided. The extending arms 5, 5, Fig. 3, are reduced in length as much as practicable with each successive arm starting from the one nearest the center of the frame plate, and continuing until the line of travel of the belt shall be in parallel with the face of the frame, when extending arms are discontinued. Prior to the belt reaching the parallel with reference to the face of the frame plate the slight unavoidable lateral tendency of the belt, due to the angle of travel is compensated for by placing the initial spool shafts, holding the spools over which the belt must run, at a suitable angle with reference to the frame plate so that there is a uniform tension at all times over the entire surface of that portion of the belt within the frame area. Referring particularly to endless belt 2, section of which is shown in Fig. 4; it is practicable that the film to be exhibited, may, of itself, be adapted to the form of an endless belt simply by joining the two ends together but the usefulness of the film under such arrangement is comparatively shortlived, due to unavoidable breakage in the film and mutilation of the perforation edges, and I have therefore found it highly valuable to provide a belt constructed of a wear resisting material, preferably finely tempered steel tape, designed to relieve the strain and protect the perforated edges of the film during the process of projection. The side perforations in the belt correspond as near as may be in size and location with similar perforations in the film, and the cut out portions between the side perforations are large enough to frame and permit of the projection of the essential portions of the film pictures.

The operation of my apparatus is as follows:

The film conveying apparatus is secured conveniently near to the projection machine and the free portion of the endless belt (i. e. that portion not within the frame and sprocket assembly) is inserted into the projection mechanism, the threading process being the same as with an ordinary film. The end of the film first to be exhibited, (in other words, the "beginning" of the film) is secured to one of the cross pieces of the endless belt, preferably at or near the points 20, 20, 20, Fig. 1, care being exercised to see that the side perforations in the belt and those in the film are in corresponding alignment. The projecting mechanism is then slowly started forward and the resultant pull on the endless belt has the effect of imparting a rotary motion to the "feed off" control sprockets, resulting in the revolution of shaft 12, Fig. 2, turning chain wheel 13, which in turn governs by roller chain 14 the movement of chain wheel 15, which transmitted through the shaft 16 causes the "take on" control sprockets to draw within the frame the slack portion of the belt which has passed through the projection mechanism. It will be noted that by this arrangement the proportion of the belt with reference to its length remains the same within the frame and spools at all times. The forward movement of the projection mechanism is continued until all of the film to be exhibited is lying flat on the endless belt, the cross pieces of the latter being equally distant from the center of any two successive film pictures. The end of the film is then secured to a convenient cross piece of the endless belt rendering the film ready for exhibition. To prevent the film "creeping" along the belt or otherwise becoming displaced from its proper position with relation to the belt I have found it convenient to apply a little film cement or other adhesive preparation between the belt and the film throughout the course of the film, this feature being particularly useful in the event of a breakage in the film, in that it avoids the now current practice of splicing in order to effect a repair. With the proper installation of the film as described, the exhibition of the pictures may proceed and may be repeated as many times as desired without further manipulation of the film and without needed stoppage of the projection mechanism, the film feed being automatic. It is of course understood that the maximum length of film which may be exhibited with my apparatus at one time is limited by the length of the endless belt employed, but any shorter length of film may conveniently be shown, the apparatus being particularly adaptable to the exhibition of the shorter lengths of film where progressive repetition of the exhibition is the purpose desired to be accomplished.

Having described the construction and operation of my apparatus, I claim:

1. In motion picture projection machines, an endless means adapted to have a film for projection affixed thereto throughout the course of the pictures to be exhibited and further adapted to allow light from the projector to pass through the film pictures carried on said endless means, substantially as described.

2. In combination for motion picture projection purposes, an endless film conveyor adapted to be operated through the projection mechanism of a projector, means to support said conveyor and separate the windings or layers of the same, and means to coordinate the rate of travel of the conveyor throughout the length of the same, substantially as set forth.

3. A picture carrying film strip and a cooperating protecting strip consisting of a material offering greater resistance to wear and injury than the film strip, the two strips being united to remain in fixed relation to each other in a projecting machine.

4. A picture carrying film strip and a cooperating protecting strip consisting of a material offering greater resistance to wear and injury than the film strip, the two strips being united to remain in fixed relation to each other in a projecting machine, said cooperating protecting strip having means near its edges cooperating with the feeding mechanism of a projecting machine to feed the two strips together.

5. A picture carrying film strip and a cooperating protecting strip consisting of a material offering greater resistance to wear and injury than the film strip and apertured to permit the exhibition of the pictures on the film strip, the two strips being united to remain in fixed relation to each other in a projecting machine.

6. A picture carrying film strip and a cooperating protecting strip consisting of a material offering greater resistance to wear and injury than the film strip, of at least equal length with the film strip, the two strips being united to remain in fixed relation to each other in a projecting machine.

7. A picture carrying film strip and a strip of flexible metal of at least equal length with the film strip, the two strips being attached together to run through a projecting machine as a unit, the metal strip having rows of perforations along the edges thereof, to cooperate with the feeding mechanism of a projecting machine and having apertures for the projection of the light through the pictures of the film strip.

8. A mechanism for handling an endless picture film strip, including in combination, means for feeding the film strip as required and a plurality of substantially concentrically arranged series of devices for supporting the film strip and permitting the feed thereof but located relatively to each other to prevent friction and contact between the parts of the film strip.

9. A mechanism for handling an endless picture film strip including in combination means for feeding the film strip as required and a plurality of circular series of rollers, said series being substantially concentrically arranged to support and direct a single layer of the endless picture film strip.

10. A mechanism for handling an endless picture film strip including in combination means for feeding the film strip as required and a plurality of circular series of rollers, said series being substantially concentrically arranged to support and direct a single layer of the endless picture film strip, the series of rollers being separated from each other sufficiently to prevent contact between the corresponding parts of the film strip.

In testimony that I claim the foregoing as my invention I have signed my name in presence of the subscribing witnesses, this tenth day of December, 1920.

ARTHUR PRICE.

Witnesses:
CYRIL P. McCOY,
WALTER GARTLAND.